US009812231B2

(12) United States Patent
Huang et al.

(10) Patent No.: US 9,812,231 B2
(45) Date of Patent: Nov. 7, 2017

(54) JACKET COMPOSITION FOR RISER AND PLENUM CABLES

(71) Applicant: General Cable Technologies Corporation, Highland Heights, KY (US)

(72) Inventors: Ju Huang, Cincinnati, OH (US); Amjad F. Abu-Ali, Plainfield, IN (US); James D. Malkemus, Hagerstown, IN (US); Scott M. Brown, Independence, KY (US)

(73) Assignee: General Cable Technologies Corporation, Highland Heights, KY (US)

( * ) Notice: Subject to any disclaimer, the term of this patent is extended or adjusted under 35 U.S.C. 154(b) by 0 days.

(21) Appl. No.: 14/082,846

(22) Filed: Nov. 18, 2013

(65) Prior Publication Data

US 2014/0141244 A1 May 22, 2014

Related U.S. Application Data

(60) Provisional application No. 61/727,931, filed on Nov. 19, 2012.

(51) Int. Cl.
| | |
|---|---|
| H01B 7/295 | (2006.01) |
| H01B 3/44 | (2006.01) |
| C08K 3/22 | (2006.01) |
| C08K 3/24 | (2006.01) |
| C08K 3/36 | (2006.01) |
| C08K 5/00 | (2006.01) |
| C08K 5/12 | (2006.01) |
| C08K 5/521 | (2006.01) |
| C09K 21/02 | (2006.01) |
| C08K 3/38 | (2006.01) |

(52) U.S. Cl.
CPC ............ *H01B 7/295* (2013.01); *C08K 3/22* (2013.01); *C08K 3/24* (2013.01); *C08K 3/36* (2013.01); *C08K 5/0016* (2013.01); *C08K 5/12* (2013.01); *C08K 5/521* (2013.01); *C09K 21/02* (2013.01); *H01B 3/443* (2013.01); *C08K 2003/2227* (2013.01); *C08K 2003/387* (2013.01); *C08K 2201/014* (2013.01); *Y10T 428/2958* (2015.01)

(58) Field of Classification Search
CPC ... C08K 5/09; C08K 5/12; C08K 3/22; C08K 5/13; C08K 13/02; C08K 9/02; C08K 3/24; C08K 3/38; C08K 3/346; C08K 9/04; C08K 5/10; C08K 5/00; H01B 3/441; H01B 3/44; H01B 3/443; H01B 7/0216; H01B 7/295; H01B 7/00; Y10T 428/294; Y10T 428/2938; Y10T 29/49117; Y10T 428/2958; C08L 27/06; C08L 23/0869; C08L 27/24; C08L 67/04; C08L 2666/04; C08L 2666/02; C08L 57/08; A61K 31/70; A61K 47/48238; A61K 47/48092; C07C 69/76
USPC .... 428/389, 378, 379, 470, 472.2, 500, 699; 524/141, 100, 288, 411, 412, 424, 425, 524/436, 437, 406, 398, 399, 143, 378, 524/379, 523, 527, 405; 174/110 R, 174/120 R, 120 SC, 113 C, 36, 120 SR, 174/11 V; 525/331.6, 334.1, 222, 331.5, 525/317
See application file for complete search history.

(56) References Cited

U.S. PATENT DOCUMENTS

| | | | |
|---|---|---|---|
| 5,036,121 A | 7/1991 | Coaker et al. | |
| 5,227,417 A * | 7/1993 | Kroushl, III | .......... 524/114 |
| 5,886,072 A | 3/1999 | Linsky et al. | |
| 6,043,312 A | 3/2000 | Fagher et al. | |
| 2006/0128866 A1* | 6/2006 | Diakoumakos et al. | ..... 524/445 |
| 2007/0246240 A1 | 10/2007 | Alexander et al. | |
| 2010/0292379 A1* | 11/2010 | Fung et al. | .......... 524/296 |
| 2011/0198108 A1 | 8/2011 | Abu-Ali et al. | |
| 2011/0220387 A1* | 9/2011 | Szylakowski | .......... H01B 7/295 174/113 C |

FOREIGN PATENT DOCUMENTS

| | | |
|---|---|---|
| WO | 9919395 A1 | 4/1999 |
| WO | 00-66657 | 11/2000 |
| WO | 2000-66657 A1 | 11/2000 |
| WO | 2011-112704 A2 | 9/2011 |

OTHER PUBLICATIONS

Santa Cruz Biotechnology, Pyronil 45 Technical Data Sheet, copyright 2007-2015, Santa Cruz Biotechnology, Inc., http://www.scbt.com/datasheet-391703-casnumber-26040-51-7.html.*
Journal of Fire Sciences, Flame and Smoke Retardants in Vinyl Chloride Polymers, copyright 2006 SAGE Publications, pp. 211-227.*

(Continued)

*Primary Examiner* — Arti Singh-Pandey
(74) *Attorney, Agent, or Firm* — Ulmer & Berne LLP

(57) ABSTRACT

The present invention relates to materials for making cable jackets, particularly for riser and plenum cables. The materials provide low flammability and allow the cable to meet UL 910 or NFPA-262 or UL 1666 specifications. The composition contains polyvinyl chloride (PVC) resin, a plasticizer, ammonium octamolybdate, a molybdate compound, a stabilizer, a lubricant, aluminum trihydrate, and either i) metal oxide particles, ii) a polytetrafluoroehtylene (PTFE), iii) an intumescent compound, or iv) combinations thereof.

20 Claims, No Drawings

(56) References Cited

OTHER PUBLICATIONS

Chang, Bong Ho; International Search Report and Written Opinion of the International Searching Authority, issued in International Application No. PCT/US2013/070104; dated Feb. 26, 2014; 12 pages.

"Chapter 2: Life-Cycle Inventory," Wire and Cable Insulation and Jacketing: Life-cycle Assessments for Selected Applications: Summary. Washington, DC: U.S. Environmental Protection Agency, 2008; pp. 21-23, 29, 30.

Potzsch, Robert; Extended European search report, including the supplementary European search report and the European search opinion; dated Oct. 27, 2016; 12 pages.

Pötzsch, Robert; Partial Supplementary European Search Report, issued in European Patent Application No. 13854605.6; dated Jul. 4, 2016; 8 pages.

Potzsch, Robert; Examination Report issued in European Patent Application No. 13854065.6; dated Aug. 9, 2017; 5 pages.

\* cited by examiner

JACKET COMPOSITION FOR RISER AND PLENUM CABLES

This application claims the priority of U.S. Provisional Patent Application No. 61/727,931, filed Nov. 19, 2012, which is incorporated herein by reference.

FIELD OF THE INVENTION

The present invention relates to materials for making cable jackets, particularly for riser and plenum cables. The materials provide low flammability and allow the cable to meet UL 910 or NFPA-262 or UL 1666 specifications.

BACKGROUND OF THE INVENTION

Buildings are usually designed with a space between a drop ceiling and a structural floor from which the ceiling is suspended to serve as a return air plenum for elements of heating and cooling systems as well as serving as a convenient location for the installation of communications cables and other equipment, such as power cables and data cables. Such data cables also called plenum cables. Alternatively, the building can employ raised floors used for cable routing and plenum space. Communications cables generally include voice communications, data and other types of signals for use in telephone, computer, control, alarm, and related systems, and it is not uncommon for these plenums and the cables therein to be continuous throughout the length and width of each floor, which can introduce safety hazards, both to the cables and the buildings.

When a fire occurs in an area between a floor and a drop ceiling, it may be contained by walls and other building elements which enclose that area. However, if and when the fire reaches the plenum space, and especially if flammable material occupies the plenum, the fire can spread quickly throughout the entire floor of the building. The fire can travel along the length of cables which are installed in the plenum if the cables are not rated for plenum use, i.e., do not possess the requisite flame and smoke retardation characteristics. Also, smoke can be conveyed through the plenum to adjacent areas and to other floors with the possibility of smoke permeation throughout the entire building.

As the temperature in a non-plenum rated jacketed cable rises, charring of the jacket material begins. Afterwards, conductor insulation inside the jacket begins to decompose and char. If the charred jacket retains its integrity, it still functions to insulate the core; if not, however, it ruptures due either to expanding insulation char or to pressure of gases generated from the insulation, and as a consequence, exposes the virgin interior of the jacket and insulation to the flame and/or the elevated temperatures. The jacket and the insulation begin to pyrolize and emit more flammable gases. These gases ignite and, because of air drafts in the plenum, burn beyond the area of flame impingement, thereby propagating flame thru the building and generating smoke and toxic and corrosive gases.

Because of the possibility of flame spread and smoke evolution, as a general rule, the National Electrical Code (NEC) requires that power-limited cables in plenums be enclosed in metal conduits. However, the NEC permits certain exceptions to this requirement. For example, cables without metal conduits are permitted, provided that such cables are tested and approved by an independent testing agent, such as Underwriters Laboratories (UL), as having suitably low flame spread and smoke generating or producing characteristics. The flame spread and smoke production of cables are measured using the UL 910 (1998 edition) or NFPA 262 (2011 edition), also known as the "Steiner Tunnel," standard test method for fire and smoke retardation characteristics of electrical and optical fiber cables used in air handling spaces, i.e., plenums.

The standard for Plenum cable (UL910, also called NFPA-266)) was developed by Underwriter Laboratory (UL) and adopted by the National Fire Protection Association (NFPA). It is based on ASTM E84 Steiner tunnel test. In this test, a bundle of cable are subjected to a constant flame at a constant air velocity. The number of cables in this bundle is determined based on the outer diameter of the cable. The bundle is then subjected to the test and flame spread as well as density measurements are recorded. In order to pass the test, a maximum of 0.50 density units peak, and a maximum average of 0.15 are required. Flame spread (propagation) must not exceed 5 feet in length.

A riser (CMR) rated cable is a cable that meets the UL1666 requirements. These cables are designed for installations in vertical trays between floors or through elevator shafts. The cable typically contains insulated wires twisted, and jacketed with a Riser type jacket. The purpose of this invention is to describe a composition of a PVC compound used as a jacket for these types of cables.

The most important property of a CMR cable is to pass the vertical burn UL1666 test. The test apparatus and procedure is detailed in UL1666, section 4. The test is done by installing finished cables in a chamber. The cables are then exposed to a continuous flame (at 154.5 KW) for 30 minutes. To pass the test, the flame propagation can not equal or exceed 12 feet beyond the ignition point, and the temperature can not exceed 850° F. as described in section 9 of UL1666.

One of the main obstacles to developing a polyvinyl chloride (PVC) jacket composition to meet the UL1666 specifications, is to maintain a low flammability during the 30 minute burn. To do so, formulators tend to add a significant amount of bromine (in the form of brominated phthalates) and antimony. Those two additives, along with aluminum trihydrate, can provide for low flammability. However, those additives are costly.

Therefore, there remains a need for jacket compositions for plenum and riser cable that provide low flammability, but can be made inexpensively.

SUMMARY OF THE INVENTION

In one embodiment, the present invention provides compositions for use as jacket for riser or plenum cable. The composition has been developed to meet UL 910 (1998 edition) and/or NFPA 262 (2011 edition) and/or UL 1666 (2007 edition) specifications and contains polyvinyl chloride (PVC) resin, a plasticizer, ammonium octamolybdate, a molybdate compound, a stabilizer, a lubricant, aluminum trihydrate, and either i) metal oxide particles, ii) a polytetrafluoroehtylene (PTFE), iii) an intumescent compound, or iv) combinations thereof. The composition can further contain magnesium hydroxide, zinc borate, calcium silicate, and/or brominated fire retardant. Each of those additional components should be present at less than about 50 phr, preferably about 10 to about 40 phr, and more preferably 20 to about 30 phr.

Preferably, the metal oxide particle is spherical amorphous silicon dioxide. More preferably, the spherical amorphous silicon dioxide has a mean particle size of about 100-200 nm and/or a BET surface area of about 10-30 $m^2/g$.

The metal oxide particle is also preferably metal oxide particle non-porous, non-ionic, and/or non-hydrated.

In another embodiment, the present invention provides a cable containing at least one wire and a jacket surrounding the wire. The jacket is made of a composition containing a PVC resin, a plasticizer, ammonium octamolybdate, a molybdate compound, a stabilizer, a lubricant, aluminum trihydrate, and either i) metal oxide particles, ii) PTFE, iii) an intumescent compound, or iv) combinations thereof. The cable meets UL 910 and/or NFPA 262 and/or UL 1666 specifications.

In yet another embodiment, the present invention provides methods for making PVC compositions for use as jacket or insulation for riser or plenum cable. The compositions are made by mixing a PVC resin, a plasticizer, ammonium octamolybdate, a a molybdate compound, a stabilizer, a lubricant, aluminum trihydrate, and either i) metal oxide particles, ii) PTFE, iii) an intumescent compound, or iv) combinations thereof together to form a composite material.

In a further embodiment, the present invention provides methods for making plenum or riser cables that meet UL 910 and/or NFPA 262 and/or UL 1666 specifications. The cables are made by mixing a PVC resin, a plasticizer, ammonium octomolybdate, a molybdate compound, a stabilizer, a lubricant, aluminum trihydrate, and either i) metal oxide particles, ii) PTFE, iii) an intumescent compound, or iv) combinations thereof together to form a composite material; and surrounding the composite material around at least one insulated wire to form a jacket. Preferably, the jacket formation is accomplished by extrusion.

DETAILED DESCRIPTION OF THE PREFERRED EMBODIMENTS

Polyvinyl chloride (PVC) resins that are appropriate for the present invention are medium or high molecular weight, general purpose vinyl suspension resins. Such PVC resins are well known in the art and are commercially available from numerous sources. Preferred PVC resin include GG-5415 which is commercially available from Georgia Gulf as a high molecular weight general purpose vinyl suspension resin, and SE-1300 which is available from Shintech Inc. as having a degree of polymerization of 1300 and a number average molecular weight of 80,600. The PVC resin in the jacket composition is defined as 100 parts. The other components are specified herein based on 100 parts by weight of the PVC, which is abbreviated as "phr" (parts per hundred rubber).

Plasticizers are well-known in the art and are added to the composition to improve its flexibility and processing properties. Plasticizers appropriate for the present invention include, but are not limited to, diisodecyl phthalate, di(2-propyl heptyl) phthalate, n-octyl-n-decyl phthalates (mixed), diallyl phthalate, dioctyl sebacate, n-octyl-n-decyl trimellitate, triisooctyl trimellitate, isodecyl diphenyl phosphate ester, di-2-ethylhexyl adipate, di-2-ethylhexyl azelate, di-2-ethylhexyl sebacate, butyl benzyl sebacate, diisodecyl adipate, pentaerytritol ester, and acrylic acid-ethylene-vinyl acetate terpolymer. The preferred plasticizer is isodecyl diphenyl phosphate ester. Preferably, the plasticizer is present in the jacket composition from about 10 to about 40 phr, more preferably about 20 to about 30 phr, and most preferably about 25 to about 30 phr.

The present composition may also contain a brominated phthalate, a fire retardant plasticizer used in compositions that require good flame performance. Commonly available brominated phthalate include FRP-45 manufactured by Unitex; and DP-45 (tetrabromophthalate ester) available from Chemtura in Middlebury, Conn. Preferably, the brominated phthalate is present in the jacket composition from about 5 to about 30 phr, more preferably about 15 to about 25 phr, and most preferably about 23 phr.

The stabilizer, can be, but is not limited to, hindered amine light stabilizers (HALS), andtioxidants, and/or heat stabilizers and is present in the jacket composition from about 0.1 to about 10 phr, more preferably about 0.1 to about 8 phr, and most preferably about 0.1 to about 6 phr. The HALS can include, for example, bis(2,2,6,6-tetramethyl-4-piperidyl)sebaceate (Tinuvi"® 770); bis(1,2,2,6,6-tetramethyl-4-piperidyl)sebaceate+methyl1,2,2,6,6-tetrameth-yl-4-piperidyl sebaceate (Tinuvi"® 765); 1,6-Hexanediamine, N,N'-Bis(2,2,6,6-tetramethyl-4-piperidyl)polymer with 2,4,6 trichloro-1,3,5-triazine, reaction products with N-butyl2,2,6,6-tetramethyl-4-piperidinamine (Chimassor$^b$® 2020); decanedioic acid, Bis(2,2,6,6-tetramethyl-1-(octyloxy)-4-piperidyl)ester, reaction products with 1,1-dimethylethylhydroperoxide and octane (Tinuvi"® 123); triazine derivatives (tinuvi"® NOR 371); butanedioc acid, dimethylester, polymer with 4-hydroxy-2,2,6,6-tetramethyl-1-piperidine ethanol (Tinuvi"® 622); 1,3,5-triazine-2,4,6-triamine,N,N'''-[1,2-ethane-diyl-bis[[[4,6-bis- -[butyl(1,2,2,6,6pentamethyl-4-piperdinyl)amino]-1,3,5-triazine-2-yl] imino-]-3,1-propanediyl]]bis[N',N''-dibutyl-N',N''bis(2,2,6,6-tetramethyl-4-pipe-ridyl) (Chimassor$^b$® 119); and/or bis (1,2,2,6,6-pentamethyl-4-piperidinyl)sebacate (Songligh$^t$® 2920); poly[[6-[(1,1,3,3-terramethylbutyl)amino]-1,3,5-triazine-2,4-diyl][2,2,6,6-tetramethyl-4-piperidinyl)imino]-1, 6-hexanediyl[(2,2,6,6-tetramethyl-4-piperidinyl)imino]] (Chimassor$^b$®944); Benzenepropanoic acid, 3,5-bis(1,1-dimethyl-ethyl)-4-hydroxy-.C7-C9 branched alkyl esters (Irgano$^x$® 1135); and/or Isotridecyl-3-(3,5-di-tert-butyl-4-hydroxyphenyl)propionate (Songno$^x$® 1077 LQ). The preferred HALS is bis(1,2,2,6,6-pentamethyl-4-piperidinyl) sebacate commercially available as Songlight 2920.

Antioxidants without heat stabilization action can be used in this composition. They are typically a phenol derivatives (hindered phenols). Other known antioxidants are aromatic amine derivatives. Their main function is a free radical scavenging and to prevent dehydrochlorination. The antioxidants can be, but is not limited to, 4,6-bis (octylthiomethyl)-o-cresol (Irgastab KV-10); dioctadecyl 3,3'-thiodipropionate (Irganox PS802); poly[[6-[(1,1,3,3-terramethylbutyl)amino]-1,3,5-triazine-2,4-diyl][2,2,6,6-tetramethyl-4-piperidinyl)imino]-1,6-hexanediyl[(2,2,6,6-tetramethyl-4-piperidinyl)imino]] (Chimassorb®944); Benzenepropanoic acid, 3,5-bis(1,1-dimethyl-ethyl)-4-hydroxy-C7-C9 branched alkyl esters (Irganox® 1135); Isotridecyl-3-(3,5-di-tert-butyl-4-hydroxyphenyl)propionate (Songnox® 1077 LQ). If used, the preferred heat stabilizer is 4,6-bis(octylthiomethyl)-o-cresol (Irgastab KV-10); dioctadecyl 3,3'-thiodipropionate (Irganox PS802), and/or poly [[6-[(1,1,3,3-terramethylbutyl)amino]-1,3,5-triazine-2,4-diyl][2,2,6,6-tetramethyl-4-piperidinyl)imino]-1,6-hexanediyl[(2,2,6,6-tetramethyl-4-piperidinyl)imino]] (Chimassorb®944).

Heat stabilizers are needed to prevent the degradation of PVC compositions during processing. They prevent the unzipping of PVC chains by reacting with the generated HCL gas. These stabilizers are based on mixed metals. They typically contain hydrotalcites to enhance the effectiveness of the stabilizer. They include a primary metal, such as zinc salts or cadmium salts, and a secondary metal, typically barium salts or calcium salts. The most widely used mixed metals stabilizers are calcium and zinc mixed metals. These stabilizers can be, but not limited to, Ba—Cd—Zn (commercially available as Mark®2077, Mark®7202, Mark®7103, Thermcheck® 1237, Thermcheck®6116, and Thermcheck®6580), Ca—Zn (Mark® 593, Mark® QTS, Synpron® 1699 Interstab® CZL720, and Thermcheck® 203P). The preferred stabilizer in this invention is Ca—Zn stabilizer commercially available as Thermcheck® 203P.

Smoke suppressants and char promoters are essential to the smoke performance of plenum cables. Octamolybdates and molybdenum compounds can be used in PVC plenum compositions. In the present composition, ammonium octamolybdates (AOM) and a molybdate compound (different from the ammonium octamolybdates) are preferably useful to assist in suppressing smoke generation during flame. The levels of AOM used in this invention is about 10 to about 40 phr, preferably about 15 to about 35 phr, more preferably about 20 to about 30 phr. The preferred molybdate compound for this invention is a zinc molybdate/magnesium silicate complex, available commercially as Kemgard® 1100 and is used at about 10 to about 40 phr, preferably about 15 to about 30 phr, more preferably about 20 to about 25 phr.

Examples of suitable lubricants include, but are not limited to, stearic acid, silicones, anti-static amines, organic amities, ethanolamides, mono- and di-glyceride fatty amines, ethoxylated fatty amines, fatty acids, zinc stearate, stearic acids, palmitic acids, calcium stearate, lead stearate, zinc sulfate, and combinations thereof. Lubricants may be added to improve processing properties of the composition. However, some lubricants, such as silicone and fatty acid amides, also provide lubrication of the outer surface of the cable jacket to reduce friction during installation of the plenum or riser cable. Advantageous lubricants for friction reducing include, but are not limited to, oleamide, erucamide, stearamide, behenamide, oleyl palmitamide, strearyl erucamide, ethylene bis-stearamide, and ethylene bis-oleamide. Those lubricants are evenly distributed in the melt phase; however, as the polymer cools, the lubricants migrate to the surface of the composition to form a thin lubricating layer, which reduces the coefficient of friction between surfaces. The level of lubricants used in this invention is about 0.1 to about 2.0 phr, preferably about 0.25 to about 1.5 phr, and more preferably about 0.7 to about 1.5 phr. The preferred lubricants are fatty acids (available commercially as Loxiol G-40) and stearic acid.

Any aluminum trihyrate (ATH), precipitated or ground, is appropriate for the present invention. It has the chemical formula $Al(OH)_3$ and is efficient in absorbing heat and releasing water by the decomposition reaction $2Al(OH)_3 \rightarrow Al_2O_3 + 3H_2O$. There are several grades of ATH with different particle size, and are all suitable for this invention taking in consideration the effect of particle size on the overall performance of ATH. The average particle size of ATH ranges between 0.5 to 55 microns. Several grades are commercially available with trade names like Polyfill®, Hydral®, Martinal®, Micral® and others. The preferred ATH used in this invention is a precipitated ATH with a particle size of 1.0 microns (commercially available as Hydral PGA-SD). The amount of ATH used in this invention is about 20 to about 80 phr, preferably about 40 to about 80 phr, and more preferably about 50 to about 70 phr.

The micro oxide particles are oxides characterized by having a spherical shape and non-ionic character, i.e. without a positive or negative ionic valence, cannot form an ionic bond, mineral, or metal (element). Preferably the particles have a low surface area that imparts improved rheological and fire resistance properties. The BET surface area of the micro oxide particles is preferably about 10-30 $m^2/g$, more preferably about 18-22 $m^2/g$, and most preferably about 20 $m^2/g$. Preferred oxides include silicon, aluminum, magnesium and their double oxides. Zn and Fe oxides may also be suitable for some embodiments of the invention. Other oxides are envisioned to function in the invention but may not yet be available in the micro form described in the invention. Also, the metal oxide particles are preferably solid amorphous particles. The mean particle size of the metal oxide particles may be less than about 300 nm, and is preferably in the range of about 100-200 nm, more preferably about 150 nm. The concentration of the micro oxide particles may be about 1 to about 10 phr, preferably about 1 to about 8 phr, and most preferred about 4 to about 6 phr.

A preferred metal oxide particle is SIDISTAR® T 120, made by Elkem Silicon Materials, which is a spherically-shaped amorphous silicon dioxide additive designed for polymer applications. The average primary particle size of SIDISTAR® T 120 is 150 nm. When used with PVC, the SIDISTAR® T120 additive provides increased flame retardancy, which allows for the reduction of other expensive flame retardants (such as bromine and antimony compounds) in the composition while still meeting UL 910 or NFPA 262 or UL 1666 requirements. In the mixing process, SIDISTAR® T120 also improves the dispersion of all compound ingredients, providing well-balanced physical properties in the final composition. Because it is dispersed as primarily spherical particles, SIDISTAR® T120 also reduces internal friction and allows higher extrusion or injection speed as the result of better melt flow and therefore significant cost savings. Dispersion down to primary particles within the matrix enables a very fine cell formation, resulting in a reduction of high molecular weight processing aid and therefore much reduced raw material costs.

To be able to pass the NFPA 262 specifications, an intumescent can be added to the composition. An intumescent is a substance that swells due to heat, thereby increasing volume and decreasing density. It is typically a phosphorus containing salt, such as ammonium polyphosphates, melamine, and pentaerythritol. Examples of this type of intumescent compounds are available commercially as Intumax AC2, Intumax AC3 WM, Intumax AC3, and Maxichar. Phosphate based intumescent (such as Intumax AC-2) is preferred for the present invention. The intumescent used in this invention is about 1 to about 10 phr, preferably about 2 to about 10 phr, more preferably about 5 to about 10 phr.

The addition of PTFE, such as Dyneon® PA-5953, an additive manufactured by Dupont, minimizes the discoloration of the final product and, when used with SIDISTAR® T-120, significantly improves processability. Furthermore, both additives, which were designed as viscosity reducers, unexpectedly provide reduced smoke generation of the present composition when the composition is subjected to flame.

The composition can contain other components such as fillers, ultraviolet (UV) light absorbers, colorants, fluoropolymer (such as polytetrafluoroethylene (PTFE)), etc. Examples of suitable fillers include, but are not limited to, carbon black, clay, talc (aluminum silicate or magnesium silicate), magnesium aluminum silicate, magnesium calcium silicate, calcium carbonate, magnesium calcium carbonate, silica, magnesium hydroxide, sodium borate, calcium borate, kaolin clay, glass fibers, glass particles, or mixtures thereof.

In a preferred embodiment, the present composition contains PVC resin, tetrabromophthalate ester, a phosphate ester, ammonium octamolybdate, a molybdate compound, a stabilizer, stearic acid, fatty acid ester, aluminum trihydrate, metal oxide particles, and a PTFE resin. In another embodiment, the present composition contains PVC resin, tetrabromophthalate ester, a phosphate ester, ammonium octamolybdate, a molybdate compound, a stabilizer, stearic acid, fatty acid ester, aluminum trihydrate, metal oxide particles, and an intumescent compound. In a further embodiment, the present composition contains PVC resin, tetrabromophthalate ester, a phosphate ester, ammonium octamolybdate, a molybdate compound, a stabilizer, stearic acid, fatty acid ester, aluminum trihydrate, a PTFE resin, and an intumescent compound. In yet another embodiment, the present composition contains PVC resin, tetrabromophthalate ester, a phosphate ester, ammonium octamolybdate, a molybdate compound, a stabilizer, stearic acid, fatty acid ester, aluminum trihydrate, metal oxide particles, a PTFE resin, and an intumescent.

All of the components of the compositions utilized in the invention are usually blended or compounded together prior to their introduction into an extrusion device from which they are to be extruded onto at least one wire. The polymer and the other additives and fillers may be blended together by any of the techniques used in the art to blend and compound such mixtures to homogeneous masses. For instance, the components may be fluxed on a variety of apparatus including multi-roll mills, screw mills, continuous mixers, compounding extruders and Banbury mixers.

After the various components of the composition are uniformly admixed and blended together, they are further processed to fabricate the cables of the invention. Prior art methods for forming the composition into cable jackets are well known, and fabrication of the cable of the invention may generally be accomplished using any of the various extrusion methods.

The compositions of the invention, when used as a plenum or riser cable jacket, give surprisingly less flammability and lower smoke generation. This composition is preferably useful for a data communication cable jacket over twisted pairs of conductors, where the conductors are insulated with fluoropolymer-free materials.

Without further description, it is believed that one of ordinary skill in the art can, using the preceding description and the following illustrative examples, make and utilize the compounds of the present invention and practice the claimed methods. The following examples are given to illustrate the present invention. It should be understood that the invention is not to be limited to the specific conditions or details described in these examples.

EXAMPLES

In the examples, the compositions were mixed by a small planetary mixer to produce a dryblend. The dryblend was then passed through two roll mill to produce the desired plastic sheets. The sheets were then plagued under pressure in a heated press. The plaques were then subjected to flame and smoke tests.

TABLE 1

| Ingredient | VA-110-1 | VA-110-2 | VA-110-3 | VA-110-4 | VA-110-5 | VA-110-6 |
|---|---|---|---|---|---|---|
| PVC Resin Shintech 1300 | 100 | 100 | 100 | 100 | 100 | 100 |
| Tetrabromophthalates ester; Uniplex FRP-45 | 23 | 23 | 23 | 23 | 23 | 23 |
| Phosphate ester; S2248 | 30 | 30 | 30 | 30 | 30 | 30 |
| Ammonium Octamolybdate; AOM | 20 | 20 | 20 | 20 | 20 | 20 |
| Molybdate compound; Kemguard 1100 | 20 | 20 | 20 | 20 | 20 | 20 |
| Calcium-Zinc heat stabilizet; Thermcheck RC203P | 6.5 | 6.5 | 6.5 | 6.5 | 6.5 | 6.5 |
| Neutral Ester; Loxiol G 40 | 0.5 | 0.5 | 0.5 | 0.5 | 0.5 | 0.5 |
| Stearic Acid | 0.2 | 0.2 | 0.2 | 0.2 | 0.2 | 0.2 |
| Aluminum trihydrates; ATH | 50 | 70 | 50 | 50 | 50 | 50 |
| Silicon dioxide; Sidistar T120 | | | 1 | 10 | | |
| PTFE process aid; PA5953 | | | | | 1 | 10 |
| Intumescent salt; AC-2 | | | | | | |
| Magnesium hydroxide; MgOH | | | | | | |
| Calcium Silicate | | | | | | |
| Zinc Borate | | | | | | |
| Tetrabromophthalates ester; FRP-42 | | | | | | |
| N-alkyl-(C8 to C18) pyrrolidones; Flexidone FE 333 | | | | | | |
| Total parts | 250.2 | 270.2 | 251.2 | 260.2 | 251.2 | 260.2 |
| Smoke Density (Nonflaming Mode) | 170.43 | 186.33 | 164.86 | 174.77 | 169.45 | 160.14 |
| Smoke Index (Nonflaming Mode) | 68.5 | 100.1 | 67.7 | 70.6 | 66.5 | 64.3 |
| Smoke Density (Flaming Mode) | 128.32 | 148.35 | 190.14 | 153.24 | 151.53 | 168.45 |

TABLE 1-continued

| Ingredient | VA-110-1 | VA-110-2 | VA-110-3 | VA-110-4 | VA-110-5 | VA-110-6 |
|---|---|---|---|---|---|---|
| Smoke Index (Flaming Mode) | 48.8 | 59.6 | 134.3 | 67.4 | 71.7 | 104.5 |
| Mass loss (%) (Nonflaming Mode) | 73.8% | 54.2% | 61.3% | 52.3% | 56.3% | 58.9% |
| Mass loss (%) (Flaming Mode) | 90.0% | 81.7% | 74.3% | 75.9% | 71.2% | 65.6% |
| LOI, % | 43.5% | 46.5% | 46.5% | 47.0% | 43.5% | 45.0% |

TABLE 2

| Ingredient | VA-110-7 | VA-110-8 | VA-110-9 | VA-110-10 | VA-110-11 | VA-110-7 |
|---|---|---|---|---|---|---|
| PVC Resin Shintech 1300 | 100 | 100 | 100 | 100 | 100 | 100 |
| Tetrabromophthalates ester; Uniplex FRP-45 | 23 | 23 | 23 | 23 | 23 | 23 |
| Phosphate ester; S2248 | 30 | 30 | 30 | 30 | 30 | 30 |
| Ammonium Octamolybdate; AOM | 20 | 20 | 20 | 20 | 20 | 20 |
| Molybdate compound; Kemguard 1100 | 20 | 20 | 20 | 20 | 20 | 20 |
| Calcium-Zinc heat stabilizet; Thermcheck RC203P | 6.5 | 6.5 | 6.5 | 6.5 | 6.5 | 6.5 |
| Neutral Ester; Loxiol G 40 | 0.5 | 0.5 | 0.5 | 0.5 | 0.5 | 0.5 |
| Stearic Acid | 0.2 | 0.2 | 0.2 | 0.2 | 0.2 | 0.2 |
| Aluminum trihydrates; ATH | 50 | 50 | 25 | 50 | 50 | 50 |
| Silicon dioxide; Sidistar T120 | | | | | | |
| PTFE process aid; PA5953 | | | | | | |
| Intumescent salt; AC-2 | 1 | 10 | | | | 1 |
| Magnesium hydroxide; MgOH | | | 25 | | | |
| Calcium Silicate | | | | 10 | | |
| Zinc Borate | | | | | 5 | |
| Tetrabromophthalates ester; FRP-42 | | | | | | |
| N-alkyl-(C8 to C18) pyrrolidones; Flexidone FE 333 | | | | | | |
| Total parts | 251.2 | 260.2 | 250.2 | 260.2 | 255.2 | 251.2 |
| Smoke Density (Nonflaming Mode) | 189.5 | 308.94 | 155.48 | 175.31 | 223.97 | 189.5 |
| Smoke Index (Nonflaming Mode) | 62.2 | 129.3 | 34.3 | 65.5 | 96.3 | 62.2 |
| Smoke Density (Flaming Mode) | 183.1 | 432.51 | 218.93 | 182.83 | 157.28 | 183.1 |
| Smoke Index (Flaming Mode) | 109 | 1240.4 | 230.9 | 138.2 | 89 | 109 |
| Mass loss (%) (Nonflaming Mode) | 60.9% | 53.7% | 54.9% | 60.5% | 60.2% | 60.9% |
| Mass loss (%) (Flaming Mode) | 75.0% | 64.7% | 72.8% | 64.2% | 62.2% | 75.0% |
| LOI, % | 42.5% | 45.0% | 36.5% | 41.0% | 45.5% | 42.5% |

TABLE 3

| Ingredient | VA-110-12 | VA-110-13 | VA-110-14 |
|---|---|---|---|
| PVC Resin Shintech 1300 | 100 | 100 | 100 |
| Tetrabromophthalates ester; Uniplex FRP-45 | 0 | 18 | 23 |
| Phosphate ester; S2248 | 30 | 25 | 30 |
| Ammonium Octamolybdate; AOM | 20 | 20 | 20 |
| Molybdate compound; Kemguard 1100 | 20 | 20 | 20 |
| Calcium-Zinc heat stabilizet; Thermcheck RC203P | 6.5 | 6.5 | 6.5 |
| Neutral Ester; Loxiol G 40 | 0.5 | 0.5 | 0.5 |
| Stearic Acid | 0.2 | 0.2 | 0.2 |
| Aluminum trihydrates; | 50 | 50 | 50 |

TABLE 3-continued

| Ingredient | VA-110-12 | VA-110-13 | VA-110-14 |
|---|---|---|---|
| ATH | | | |
| Silicon dioxide; Sidistar T120 | | | 5 |
| PTFE process aid; PA5953 | | | 5 |
| Intumescent salt; AC-2 | | | 10 |
| Magnesium hydroxide; MgOH | | | 10 |
| Calcium Silicate | | | 5 |
| Zinc Borate | | | 5 |
| Tetrabromophthalates ester; FRP-42 | 23 | | |
| N-alkyl-(C8 to C18) pyrrolidones; Flexidone FE 333 | | 10 | |
| Total parts | 250.2 | 250.2 | 290.2 |
| Smoke Density (Nonflaming Mode) | 183.99 | 218.2 | 242.9 |
| Smoke Index (Nonflaming Mode) | 93.9 | 154 | 97.1 |
| Smoke Density (Flaming Mode) | 173 | 177.15 | 318.2 |
| Smoke Index (Flaming Mode) | 135.8 | 149.5 | 408.5 |
| Mass loss (%) (Nonflaming Mode) | 54.5% | 56.2% | 48.6% |
| Mass loss (%) (Flaming Mode) | 59.0% | 72.6% | 62.7% |
| LOI, % | 43.0% | 40.5% | 45.0% |

While the present invention has been described and illustrated by reference to particular embodiments thereof, it will be appreciated by those of ordinary skill in the art that the invention lends itself to variations not necessarily illustrated herein. For this reason, then, reference should be made solely to the appended claims for the purposes of determining the true scope of this invention.

What is claimed is:

1. A composition comprising
   a) a polyvinyl chloride (PVC) resin;
   b) from about 40 phr to about 70 phr of a plasticizer, wherein the plasticizer comprises tetrabromophthalate ester and isodecyl diphenyl phosphate ester;
   c) ammonium octamolybdate;
   d) a molybdate compound;
   e) a stabilizer;
   f) a lubricant;
   g) aluminum trihydrate; and
   h) an intumescent compound.

2. The composition of claim 1, wherein component h) further comprises silicon dioxide particles having a substantially spherical shape, a mean particle size of less than about 300 nm, and a BET surface area of about 10-30 m$^2$/g; polytetrafluoroethylene (PTFE); or a combination thereof.

3. The composition of claim 2, wherein component h) is present at about 1-10 phr for each of the silicon dioxide particles, PTFE, and the intumescent compound.

4. The composition of claim 2, wherein the silicon dioxide particles are solid and non porous.

5. The composition of claim 1, wherein component a) is present at about 100 parts by weight, component c) is present at about 10-40 phr, component d) is present at about 10-40 phr, component e) is present at about 0.1-10 phr, component f) is present at about 0.1-2 phr, and component g) is present at about 20-80 phr.

6. The composition of claim 1, further comprising magnesium hydroxide.

7. The composition of claim 6, wherein the magnesium hydroxide is present at less than about 50 phr.

8. The composition of claim 1, further comprising zinc borate and a brominated fire retardant.

9. The composition of claim 1, wherein the intumescent compound is ammonium polyphosphate.

10. The composition of claim 1, wherein the intumescent compound is present at about 1-10 phr.

11. A plenum or riser cable comprising a plurality of wires surrounded by a jacket, wherein the jacket comprises
    a) a polyvinyl chloride (PVC) resin;
    b) from about 40 phr to about 70 phr of a plasticizer, wherein the plasticizer comprises tetrabromophthalate ester and isodecyl diphenyl phosphate ester;
    c) ammonium octamolybdate;
    d) a molybdate compound;
    e) a stabilizer;
    f) a lubricant;
    g) aluminum trihydrate; and
    h) an intumescent compound.

12. The cable of claim 11, wherein component h) further comprises silicon dioxide particles having a substantially spherical shape, a mean particle size of less than about 300 nm, and a BET surface area of about 10-30 m$^2$/g; polytetrafluoroethylene (PTFE); or a combination thereof.

13. The cable of claim 12, wherein component h) is present at about 1-10 phr for each of the silicon dioxide particles, PTFE, and the intumescent compound.

14. The cable of claim 12, wherein the silicon dioxide particles are solid and non porous.

15. The cable of claim 11, wherein component a) is present at about 100 parts by weight, component c) is present at about 10-40 phr, component d) is present at about 10-40 phr, component e) is present at about 0.1-10 phr, component f) is present at about 0.1-2 phr, and component g) is present at about 20-80 phr.

16. The cable of claim 11, further comprising magnesium hydroxide.

17. The cable of claim 16, wherein the magnesium hydroxide is present at less than about 50 phr.

18. The cable of claim 11, further comprising zinc borate and a brominated fire retardant.

19. The cable of claim 11, wherein the intumescent compound is ammonium polyphosphate.

20. The cable of claim 11, wherein the intumescent compound is present at about 1-10 phr.

* * * * *